United States Patent [19]
Bartha et al.

[11] Patent Number: 5,717,278
[45] Date of Patent: Feb. 10, 1998

[54] FIELD EMISSION DEVICE AND METHOD FOR FABRICATING IT

[75] Inventors: Johann Bartha, Aidlingen; Johann Greschner, Pliezhausen; Volkhard Wolf, Sindelfingen, all of Germany

[73] Assignee: International Business Machines Corporation, Armonk, N.Y.

[21] Appl. No.: 445,241

[22] Filed: May 19, 1995

[30] Foreign Application Priority Data

Dec. 6, 1994 [EP] European Pat. Off. .............. 94119217

[51] Int. Cl.⁶ .................. H01J 3/02; H01J 9/02; H01J 31/12
[52] U.S. Cl. .............. 313/336; 313/309; 313/351; 313/495
[58] Field of Search .................... 313/309, 336, 313/351, 310, 495, 496

[56] References Cited

U.S. PATENT DOCUMENTS

| | | |
|---|---|---|
| 3,466,485 | 9/1969 | Arthur, Jr. et al. . |
| 3,497,929 | 3/1970 | Shoulders et al. . |
| 5,150,019 | 9/1992 | Thomas et al. . |
| 5,557,160 | 9/1996 | Makishima et al. ............ 313/336 |

FOREIGN PATENT DOCUMENTS

WO-94 15352  7/1994  WIPO .

OTHER PUBLICATIONS

IBM Technical Disclosure Bulletin, vol. 35, No. 4B, Sep. 1992 pp. 148–149, "Micro–Area Field emitter", pp. 148–149.

*Primary Examiner*—Nimeshkumar Patel
*Attorney, Agent, or Firm*—David Aker; Daniel P. Morris

[57] ABSTRACT

The invention relates to the structure of a field emitter device, to the method of fabricating a field emitter device and to the use of the field emitter device in the technical field of flat panel displays. The field emission device comprises an array (1) of widely-spaced tips (2) for emitting electrons and a perforated extracting electrode (3) facing the array of tips. An individual series resistor is formed by each of said tips itself. The widely-spaced tips are not surrounded by a layer of electrically insulating material. The tips are not surrounded by an insulating layer and the tip end is not surrounded by a gate or extraction electrode. This avoids failures like shorts between the cathode electrode and the gate or extraction electrode which could occur due to inaccurate coating or etching processes, and enhances the reliability and the life-time of the array of tips. To fabricate the field emission device, a micromechanically manufactured array (1) of widely-spaced tips (2) and a micromechanically manufactured perforated extracting electrode (3) are provided. The outer sides of the perforated extracting electrode are bonded to the array in a way that the perforated extracting electrode is facing the array. With the array of widely-spaced tips and the perforated extracting electrode being fabricated separately and bonded together subsequently, both the number of process steps required for each of the two parts and the manufacturing process costs are reduced.

12 Claims, 1 Drawing Sheet

FIELD EMISSION DEVICE AND METHOD FOR FABRICATING IT

The present invention relates to the technical field of devices using the effect to emit electrons out of a solid into vacuum due to high electric field strength, usually called field emission devices. The invention relates to the structure of a field emitter device, to the method of fabricating a field emitter device and to the use of the field emitter device in the technical field of flat panel displays.

Field emission devices can be used to replace conventional thermal emission devices as electron sources for e.g. scanning electron microscopes, high performance and high frequency vacuum tubes and generally for vacuum microelectronic devices.

In recent years there has been a growing interest in using miniaturized field emission devices in the technical field of flat panel displays. A miniaturized device which uses a multitude of tips or microtips for electron emission simultaneously and which achieves high electric field strengths by applying fairly low voltages due to tip-to-electrode distances in the micron range was firstly proposed by C. A. Spindt in Journal of Applied Physics, Vol. 39 (1968), No. 7, pages 3504–3505. Several publications by the same author and by others followed over the last twenty years. A comprehensive review is given in IEEE Transactions on Electron Devices, Vol. 38 (1991), No. 10. Almost all emission devices described and discussed there show problems of life-time, stability and the optimum current/voltage ratio.

A typical field emission device comprises a conductive tip placed on a conductive electrode which usually forms the cathode electrode. The tip end is surrounded by an extracting electrode, called the gate electrode or anode. An appropriate voltage is applied between the cathode and the gate electrode to emit electrons into the vacuum. For the application of these emission devices in the technical field of flat panel displays, the tip and gate electrode arrangement is encapsulated by an upper and lower glass plate, the upper glass plate containing the anode electrode and a phosphorous layer. An applied voltage between the cathode and the anode electrode accelerates the electrons emitted by the tip towards the phosphorous layer which emits visible light usable in a display device. Usually, an array of typically 1,000 tips is forming one pixel. Gate and cathode electrodes normally are arranged in orthogonal stripes which allows matrix addressing of the electron emitting tips.

One major problem of the application of field emission devices as light emitting sources in flat panel displays is the non-uniformity in the emission characteristics of the multitude of tips. The reliability of tip emission depends on several factors like applied voltage, cleanliness of the tips, vacuum quality, geometry, materials, etc. The field emission is extremely sensitive to the above cited factors. Despite the fact that the about 1,000 tips were electrically driven in parallel and should have formed one pixel, it was not possible to achieve stable and uniformly illuminated pixels. Typically a few of the tips operating a at high current level burst and caused short circuits between the cathode and the gate electrode. As a consequence, this short circuit disabled a complete cathode and gate electrode stripe.

In EP application 94 11 36 01.2 filed 31 Aug. 1994 the field emission device comprises an individual series resistor for each electron emitting tip. This series resistor is formed by the tip itself. The tip comprises a body of a first material with high resistivity and at least partial coating of a second material with low work function. The body of the first material forms the series resistor and the coating of the second material provides for electron emission.

This kind of a field emission device can directly be connected to the supply electrode, e.g. the cathode electrode and requires no additional resistive layer. These field emission devices are fabricated by sequential photolithographic, thin film coating and etching steps. The still high number of process steps affects the reliability and lifetime of these field emission devices and, similar to other prior art field emission devices, the tips are surrounded by an insulating layer and the tip end is surrounded by a gate electrode. Thus shorts between the cathode electrode and the gate electrode may still occur due to inaccurate coating or etching processes.

IBM Technical Disclosure Bulletin Vol. 35, No. 4B, September 1992, pages 148/149 describes a micro-area field emitter consisting of an array of closely-spaced field emission tips with a single extraction electrode. Although there is no alignment of an individual tip to its individual extraction electrode, the array of tips has to be aligned with the single extraction electrode. In order to self-limit the emission from each tip the tips are pyramids of high resistivity silicon or nitride pyramids with a conductive, resistivity controlled coating. With the requirement of an array of only 1–3 um diameter and a tip spacing of 0.1 um the fabricating of separate electrodes for each tip is difficult to produce.

DE-OS 42 32 886 discloses an emitter element with the emitting area consisting of a semiconducting diamond tip or a semiconducting diamond layer. The high-ohmic diamond tip or diamond layer is provided on a low-ohmic silicon substrate. This solution makes use of the relatively high breakthrough voltage of the diamond material compared to silicon or other materials. The diamond emitter is aligned to an electrode surrounding the emitter. Also in this prior art example the diamond tips are surrounded by an insulating layer and the tip end is surrounded by a conductive electrode consisting of a thin layer of tungsten.

The three prior art examples of field emission devices are all manufactured in a way that the emitting tips and the extraction or gate electrode are formed on the same substrate during a high number of subsequent lithography, deposition and etching steps.

It is an object of the present invention to provide a simply arranged field emission device with reliable and reproducible performance concerning the emission efficiency and with increased lifetime.

It is a further object to provide a low-cost fabrication process with a reduced number of process steps.

These objects are met by the invention as claimed in claims 1 and 13.

SUMMARY OF THE INVENTION

The field emission device comprises an array of widely-spaced tips for emitting electrons and a perforated extracting electrode facing the array of tips. An individual series resistor is formed by each of said tips itself. The widely-spaced tips are not surrounded by a layer of electrically insulating material.

The tips being not surrounded by an insulating layer and the tip end being not surrounded by a gate or extraction electrode avoids failures, like shorts between the cathode electrode and the gate or extraction electrode which could occur due to inaccurate coating or etching processes including sputtering of tip material onto the surrounding layer, and enhances the reliability and the life-time of the array of tips.

To fabricate the field emission device, a micromechanically manufactured array of widely-spaced tips and a micromechanically manufactured perforated extracting electrode are provided. The outer sides of the perforated extracting electrode are bonded to the array in a way that the perforated extracting electrode is facing the array.

With the array of widely-spaced tips and the perforated extracting electrode being fabricated separately and bonded together subsequently, the number of process steps required for each of the two parts is reduced and the manufacturing process becomes a low-cost process. Also the manufacturing of the field emission device becomes more reproducible and reliable.

Further improvements and embodiments are to be found in the dependent claims.

BRIEF DESCRIPTION OF THE DRAWINGS

Ways of carrying out the invention are described in detail below with reference to drawings showing only a specific embodiment in which.

DETAILED DESCRIPTION OF THE PREFERRED EMBODIMENT

Figure 1:
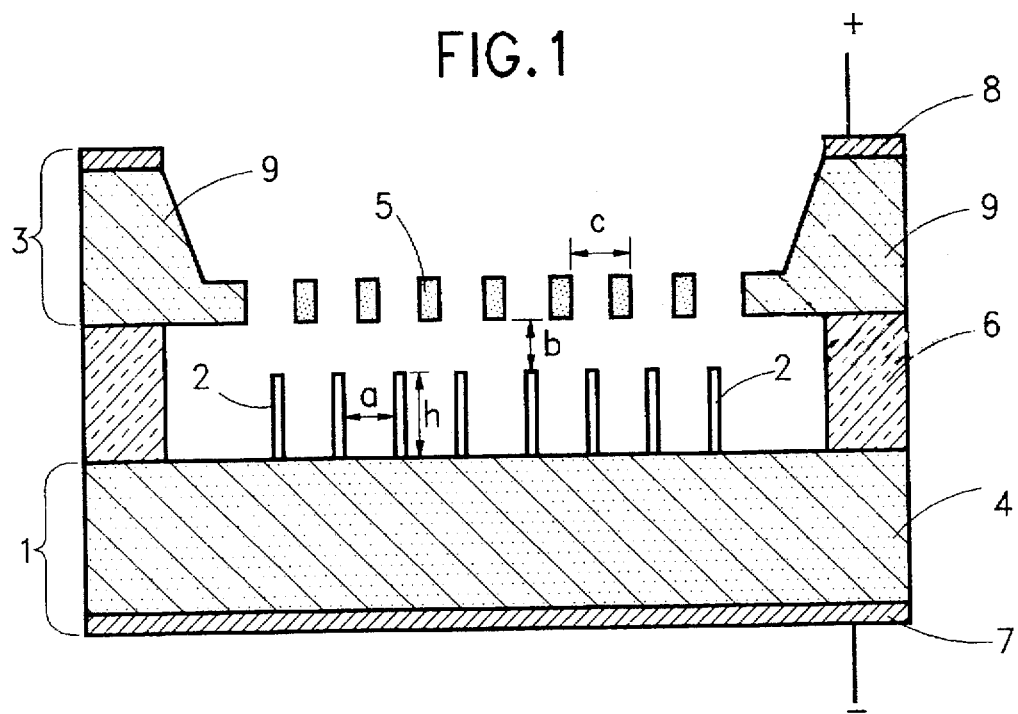
FIG. 1 is a schematic cross section of an embodiment of the field emission device and FIG. 2 shows a preferred shape of the emitter tips in a schematic cross section.

The schematic cross section in FIG. 1 shows the two parts 1 and 3 of the field emission device. The array 1 consists of a plurality of tips 2 for emitting electrons. The tips 2 are individual, self-supporting tips.

Figure 2:
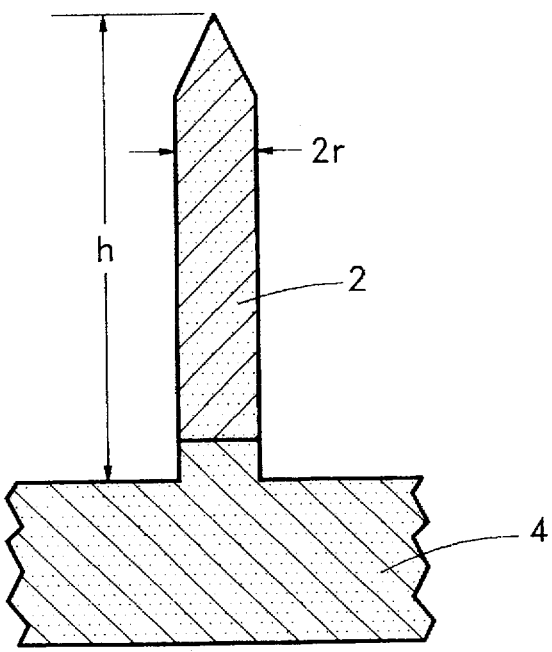

The cross section of a preferred tip shape is shown in FIG. 2. The shape of this tip 2 is defined by a high tip height h to tip radius r ratio h/r which is advantageous for the field emission of the tip. Tips showing this shape are called Eiffel Tower shaped tips. According to IEEE Transactions on Electron Devices, October. 1991, Vol. 38, No. 10, p. 2278 a rounded whisker shape is the closest to the ideal field emitter, whereas a wide-angle pyramidal shape is very poor as a field emitter even though thermal and mechanical stability are excellent. On page 2281 of this publication the conclusion is made that the ideal emitter shape as to both thermal stability and figure of merit will be an Eiffel Tower shape as shown in FIG. 8 of the referenced publication.

A preferred height h to radius r ratio h/r of the tip shown in FIG. 2 is approximately 40 with h being approximately 10 µm and r being approximately 0.25 µm and with a tip end radius of approximately 10 nm. Another preferred height h to radius r ratio h/r is approximately 30 with h being approximately 6 µm and r being approximately 0.2 µm.

The tips 2 are made of a material of high resistivity and they are connected to a substrate 4 of a low-ohmic material. Thus an individual series resistor is formed by each of said tips 2 itself which avoids the flow of critical electrical current when emitting electrons. The low-ohmic substrate material allows low-ohmic electrical current supply for the tips. The field emission device with a series resistor formed by each tip itself can be directly connected to the supply or cathode electrode. No additional resistive layer is required and the fabrication process for the emission device becomes easier, more reliable and cheaper. The tip-individual series resistor offers higher tip to tip homogeneity of electron emission, since there is no voltage drop within the array of tips. The no voltage drop effect has the advantage of lower supply voltage and therefore less power consumption and enables the use of more convenient control electronics.

The preferred material for the substrate 4 and the tips 2 is silicon, with the low-ohmic substrate 4 comprising highly doped p+ or n+ silicon, preferably a silicon wafer, with a resistance in the range of about 0.002 Ωcm. The tips 2 are preferably made of high-ohmic undoped or low doped p or n silicon which has been deposited on the substrate 4 with a resistance in the range of about 50 to 100 Ωcm. The deposition could be made by epitaxial deposition or other known suitable deposition technique.

The tips may be micromechanically fabricated according to manufucturing methods disclosed in e.g. EP-A-0 413 040.

The area of the substrate 4 where the tips 2 are to be formed may additionnally be coated with a thin metal layer of low work function.

The individual and self-supporting tips 2 are widely-spaced and they are not surrounded by a layer of electrically insulating material. In the neighbourhood of the tips thus there is no insulation material to be found. The complete avoidance of any insulating material surrounding the tips and the wide spacing of the individual tips assures the reliable and reproducible performance of the emission device and its increased lifetime. In the case that some of the tips should burst, they cannot cause short circuits between the cathode and the extraction or gate electrode and they cannot disable a complete cathode and gate electrode stripe.

Typically the lateral distance a to the directly neighboured tips is greater than the tip height h. The a/h ratio should preferably be greater than approximately 3.

The second part of the field emission device being a diode device is the perforated extracting electrode 3. The extracting or gate electrode 3 comprises a thin membrane grid 5 which is facing the array 1 of tips 2. Many prior art documents also disclose diode devices with emitting tips facing the anode electrode. In these publications the anode electrode is used for generating an electrical field and for characterizing the emission current. Electrons generated by field emission of the tips are captured by the anode electrode and are no longer available for e.g. the stimulation of phosphorous in a display or the ionization of gas atoms for analytical purposes. These problems are solved with the micromechanically manufactured perforated extracting or gate electrode or anode. To allow the current of emitted electrons to pass the perforated electrode 3 in the area of the thin membrane grid 5 the web should be thin. Typically their thickness lies in the range of a few micrometers, in a preferred embodiment it is about 4 µm. The membrane grid or web may be built up by orthogonal paths or concentric rings having a line width of approximately 1 µm.

Beside the transparency of the membrane, its web punching or grid constant c and its distance b to the tip ends of the array 1 is important. The distance b between the widely-spaced tips 2 and the perforated extracting electrode 3 should be greater than the grid constant c of the thin membrane grid 5. Typically the distance b to grid constant c ratio b/c should be greater than approximately 3 to 10. This assures that the emitting tips 2 realize the perforated extracting or anode electrode 3 as a homogenous equipotential plane.

In a preferred embodiment the b/c ratio should be approximately 3 with distance b of about 10 µm and grid constant c of about 3 µm. With these geometries, the voltage required for causing field emission is in the range of some hundred Volts.

It is very advantageous that the openings in the grid 5 need not be aligned in relation to the emitting tips 2 like in many prior art devices where an individual tip has its individual opening in the gate or extraction electrode and where tip and opening have to be exactly aligned. There is one example given in IBM Technical Disclosure Bulletin Vol. 35, No. 4B, September 1992, pages 148/149 where a group of very closely-spaced tips, but not an individual tip, has to be aligned with the single extraction electrode for this group of tips.

In special embodiments the emitting tips may be individually aligned with a grid opening. This seems suitable when the membrane grid or web is built up by supporting concentric rings. In this case an alignment is necessary which may easily be achieved before the step of bonding both parts 1 and 3 of the field emission device by optical means with an accuracy of 1 or 2 um being is sufficient.

Preferably the perforated extracting electrode is made of silicon material which allows the electrode to be easily manufactured according to known micromechanical and semiconductor process techniques.

After completion, the perforated extracting electrode 3 is connected to the array 1 of widely-spaced tips 2 by a layer 6 of electrically insulating material, by e.g. bonding, so that the membrane grid 5 is facing the tips 2 of the array 1. The layer 6 of electrically insulating material is deposited on the outer sides of the extracting electrode and not in the area of the thin membrane grid 5. Typically the electrically insulating material comprises a thermal oxide, preferably silicon oxide.

The separate manufacturing of the array of tips 1 and the extracting electrode 3 and the subsequent bonding of these two parts reduces failures during the manufacturing process and makes production of these devices more reliable and cost effective.

To avoid Schottky contacts additionally a layer 7 of electrically conductive material is provided on that surface of the array 1 not facing the perforated extracting electrode 3 and a layer 8 of electrically conductive material is provided on that surface of the outer sides 9 of the perforated extracting electrode 3 not bonded to the array 1. Both layers 7 and 8 may be metal layers.

In the same way as described above at least one additional electrode which is facing the array of tips and the perforated extracting electrode may be connected to the diode device which is extending the device to a triode device.

Should the emission device be used in the field of flat panel displays, then the at least one additional electrode comprises a photon-emitting layer and the field emission device in combination with said at least one additional electrode acts as a light emitting source.

We claim:

1. A field emission device comprising:
   an array (1) of widely-spaced tips (2) for emitting electrons said tips having shape defined by a high height to radius ratio; and
   a perforated extracting electrode (3) facing said array (1) of tips,
   wherein an individual series resistor is formed by each of said tips (2) itself and
   wherein said widely-spaced tips (2) are not surrounded by a layer of electrically insulating material and
   wherein said widely-spaced tips (2) comprise tips with the lateral distance a to the directly neighboured tips being greater than the tip height h, the a/h ratio being greater than approximately 3.

2. The field emission device of any one of claim 1 wherein said tips (2) are made of a material of high resistivity and wherein said tips (2) are connected to a substrate (4) made of a low-ohmic material.

3. The field emission device of claim 1 wherein said material of high resistivity comprises undoped or low-doped, preferably epitaxial silicon and said low-ohmic material comprises doped silicon.

4. The field emission device of claim 1 wherein said height h to radius r ratio h/r is approximately 30 with h being approximately 6 μm and r being approximately 0.2 μm or approximately 40 with h being approximately 10 μm and r being approximately 0.25 μm.

5. The field emission device of claim 1 wherein at least one additional electrode is facing said array (1) of tips and said perforated extracting electrode (3).

6. The use of the field emission device of claim 5 in the field of flat panel displays, wherein said at least one additional electrode comprises a photon-emitting layer and said field emission device in combination with said at least one additional electrode acts as a light emitting source.

7. The field emission device of claim 1 wherein said perforated extracting electrode (3) comprises a thin membrane grid (5) and wherein the openings in said grid (5) are aligned or not aligned in relation to said widely-spaced tips (2).

8. The field emission device of claim 7 wherein said perforated extracting electrode (3) is connected to said array (1) of widely-spaced tips (2) by a layer (6) of electrically insulating material, said layer (6) of electrically insulating material being not in the area of said thin membrane grid (5).

9. The field emission device of claim 8 wherein the distance b between said widely-spaced tips (2) and said perforated extracting electrode (3) is greater than the grid constant c of said thin membrane grid (5), the b/c ratio preferably being greater than approximately 3.

10. The field emission device of claim 9 wherein the material for said perforated extracting electrode (3) comprises silicon and wherein said layer (6) of electrically insulating material comprises a thermal oxide, preferably silicon oxide.

11. The field emission device of claim 8 wherein the material for said perforated extracting electrode (3) comprises silicon and wherein said layer (6) of electrically insulating material comprises a thermal oxide, preferably silicon oxide.

12. The field emission device of claim 7 wherein the distance b between said widely-spaced tips (2) and said perforated extracting electrode (3) is greater than the grid constant c of said thin membrane grid (5), the b/c ratio preferably being greater than approximately 3.

* * * * *